(No Model.)

F. W. JOHNSON.
DEVICE FOR PREVENTING REFILLING OF BOTTLES.

No. 527,992. Patented Oct. 23, 1894.

WITNESSES.
Henry Marsh.
Harry W. Aiken.

INVENTOR.
Frederick W. Johnson,
by P. E. Teschemacher
Atty.

UNITED STATES PATENT OFFICE.

FREDERICK W. JOHNSON, OF WALTHAM, MASSACHUSETTS.

DEVICE FOR PREVENTING REFILLING OF BOTTLES.

SPECIFICATION forming part of Letters Patent No. 527,992, dated October 23, 1894.

Application filed March 23, 1894. Serial No. 504,862. (No model.)

*To all whom it may concern:*

Be it known that I, FREDERICK W. JOHNSON, a citizen of the United States, residing at Waltham, in the county of Middlesex and State of Massachusetts, have invented an Improved Device for Preventing the Refilling of Bottles, of which the following is a full, clear, and exact description, reference being had to the accompanying drawings, making part of this specification, in which—

Figure 1:
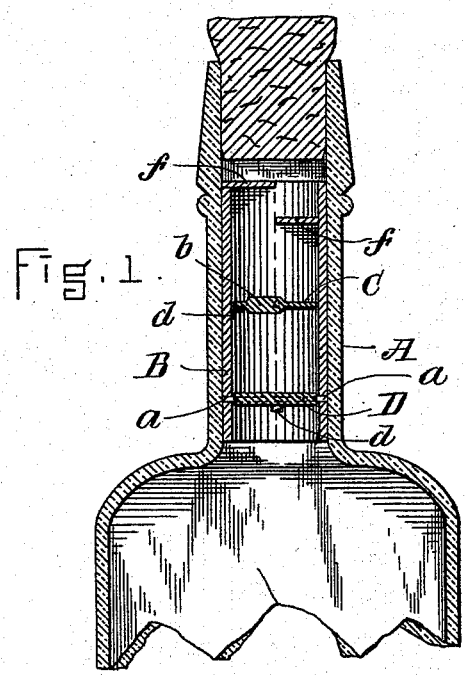
Figure 2:
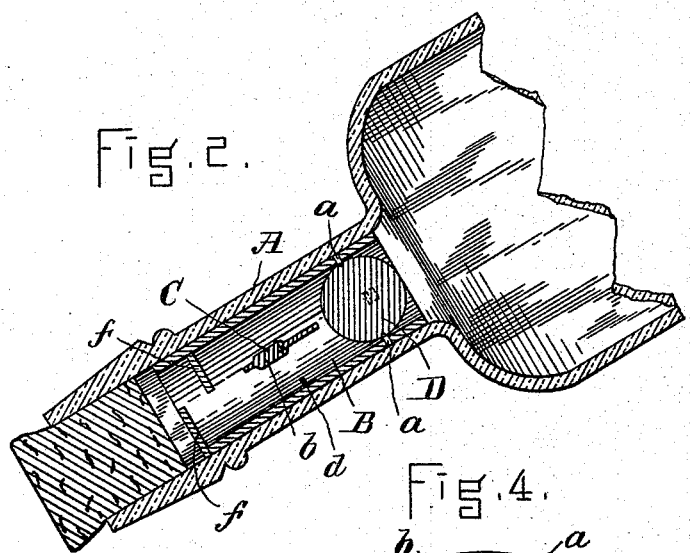
Figure 3:
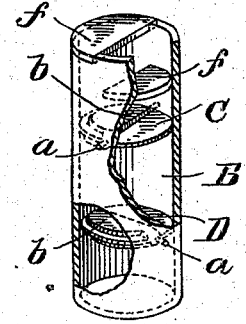
Figure 4:
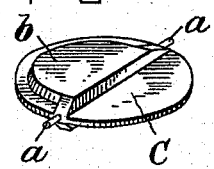

Figure 1 is a vertical section through the neck of a bottle having my improved device applied thereto. Fig. 2 is a similar section showing the position of the valves when the bottle is tipped to pour off the liquid therefrom. Fig. 3 is a perspective view of the tubular casing removed from the bottle, a portion being broken away to show the pivoted disk-valves within the same. Fig. 4 is a perspective view, enlarged, of one of the valves removed from the tubular casing.

My invention has for its object to provide a simple and reliable device for preventing bottles from being wholly or partially refilled, thereby preventing deception by the use of empty bottles bearing well known labels or names, for containing fraudulent compounds or imitations of liquids originally put up in said bottles; and to this end my invention consists in a tubular casing adapted to be secured in place within the neck or upper portion of the bottle and provided with two weighted disk-valves hung on central pivots in planes at right angles to each other in such manner that one or the other will act automatically by gravity to completely close the casing in any position in which the bottle may be held for the purpose of refilling it; said valves being constructed and arranged to open and freely permit the contents of the bottle to be poured out when it is tipped up for that purpose, as hereinafter more fully set forth; and my invention also consists in certain novel combinations of parts and details of construction as hereinafter set forth and specifically claimed.

In the said drawings, A represents the neck of a bottle within which, after the bottle has been filled, is inserted and securely fastened by cement or otherwise, a tubular casing B composed of metal or other suitable material and open at both ends as shown. Within this casing B are placed two circular or disk-valves C, D, hung on central pivots $a$ in planes at right angles to each other, each valve being of a diameter sufficient to completely close the casing. Each valve is weighted on one side of its pivots as shown at $b$ so that it will close automatically by its own gravity, the edge of one side resting, when the valve is closed, against a projection or stop $d$ on the inside of the casing B, whereby it is prevented from turning further in this direction so that any pressure or weight of liquid introduced within the mouth of the bottle will tend to keep the valve tightly closed against said stop. These valves C, D, are accurately hung on their pivots $a$, and adapted to move freely thereon, rendering them extremely sensitive so that they will open or close with a very slight movement of the bottle.

When the bottle is standing in an upright position as shown in Fig. 1, the valves are both closed, but the moment the bottle is tipped down below a level or horizontal position, both valves will open automatically as shown in Fig 2, by the action of their weighted portions $b$, thus permitting the contents of the bottle to be poured off as desired.

After the bottle has been emptied, it will be found impossible to refill it even with a pump, as the inward pressure of the liquid upon the valves C, D, will tend to tightly close the same; and by pivoting the two valves in planes at right angles to each other as shown, it will be obvious that one or the other of the said valves will close automatically in any position in which the neck of the bottle may be turned axially when held in a horizontal position or inclined upward, while said valves will also act to prevent the refilling of the bottle by submerging it in a liquid and holding it on a level or with its neck in an upwardly inclined position.

To prevent the introduction of an instrument for the purpose of holding the valves open, I provide the casing B, above the outer valve C, with a series of semicircular plates or partitions $f$ arranged alternately upon opposite sides of the interior of the casing as shown, these plates serving as guards to prevent access to the valves, without interfering with the outward flow of the liquid from the bottle.

What I claim as my invention, and desire to secure by Letters Patent, is—

1. In a device for preventing the fraudulent refilling of bottles, the combination, with a tubular casing adapted to be secured within the neck of a bottle, of two weighted disk-valves centrally pivoted within said casing in planes at right angles to each other, and adapted to open and close automatically by gravity, substantially as described.

2. In a device for preventing the fraudulent refilling of bottles, the combination, with the tubular casing B adapted to be secured within the neck of the bottle, of two weighted disk-valves C, D, hung on central pivots $a$, in planes at right angles to each other, and adapted to open and close automatically by gravity, and the projections $d$ on the inside of the casing forming stops for holding the valves in position when closed, all constructed and arranged to operate substantially as described.

3. In a device for preventing the fraudulent refilling of bottles, the combination, with the tubular casing B provided with two weighted disk-valves C, D, hung on central pivots $a$, in planes at right angles to each other, and adapted to open and close automatically by gravity, of a series of guard-plates $f$ arranged alternately upon opposite sides of the interior of the casing B above the outer valve C, substantially as and for the purpose set forth.

4. The combination, with a bottle, of a tubular casing B secured within its neck or upper portion and provided with two weighted disk-valves C, D, hung on central pivots $a$, within said casing in planes at right angles to each other and adapted to open and close automatically by gravity, the projections $d$ on the inside of the casing B forming stops for holding the valves in position when closed, and means for preventing access to the valves, all constructed to operate substantially as described.

Witness my hand this 22d day of March, A. D. 1894.

FREDERICK W. JOHNSON.

In presence of—
P. E. TESCHEMACHER,
HARRY W. AIKEN.